Nov. 11, 1958   J. R. BOYLE ET AL   2,860,228
HUMIDIFIER
Filed March 10, 1955   4 Sheets-Sheet 2
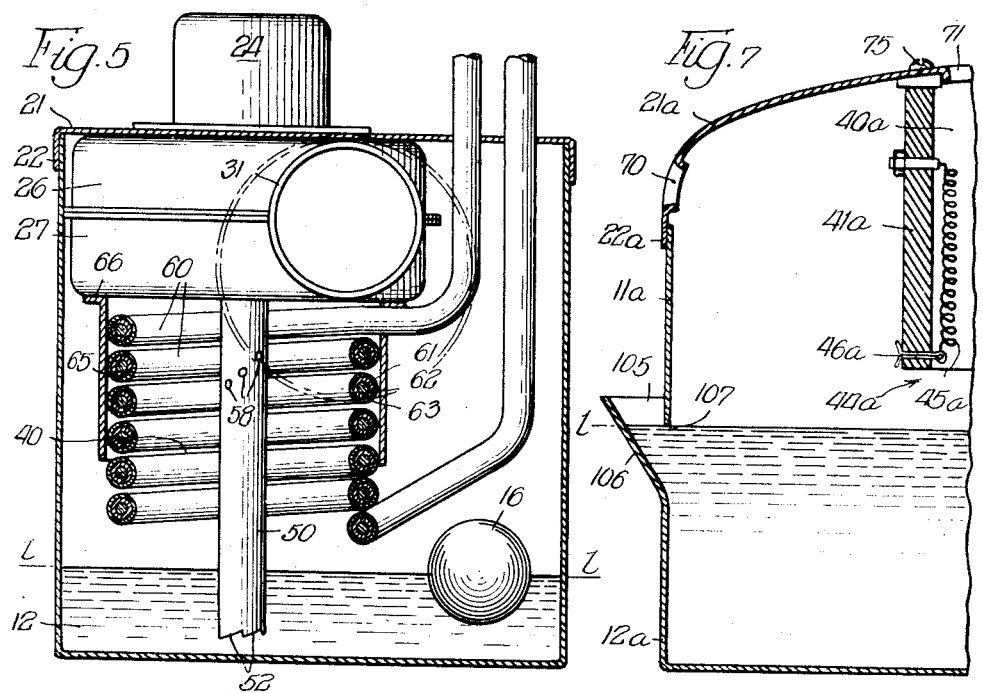
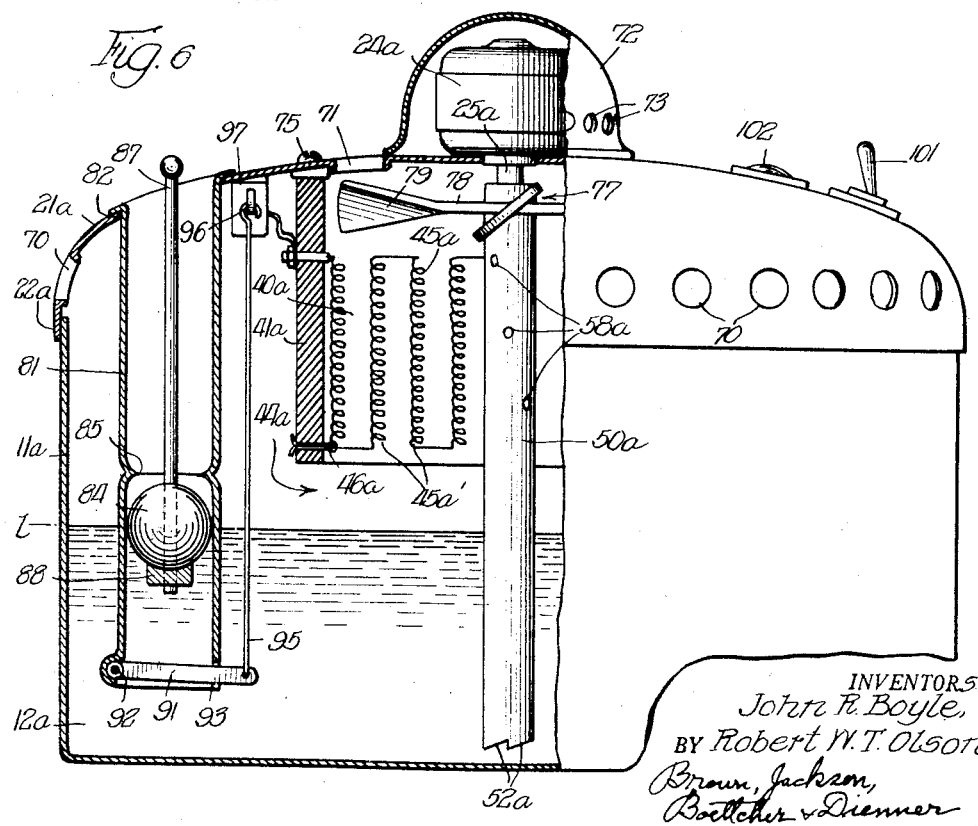
INVENTORS
John R. Boyle,
BY Robert W. T. Olson,
Brown, Jackson,
Boettcher & Dienner
Attys.

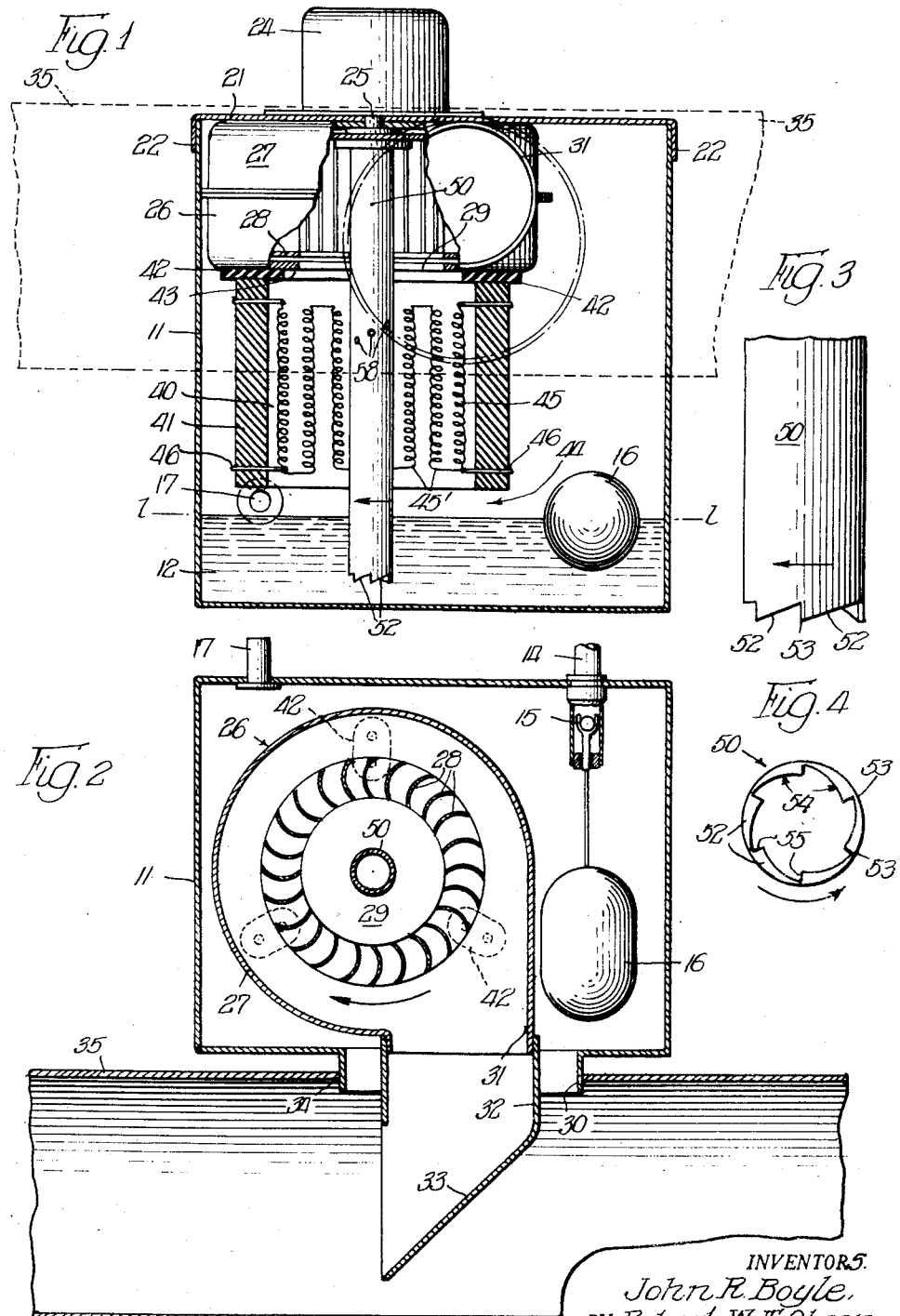

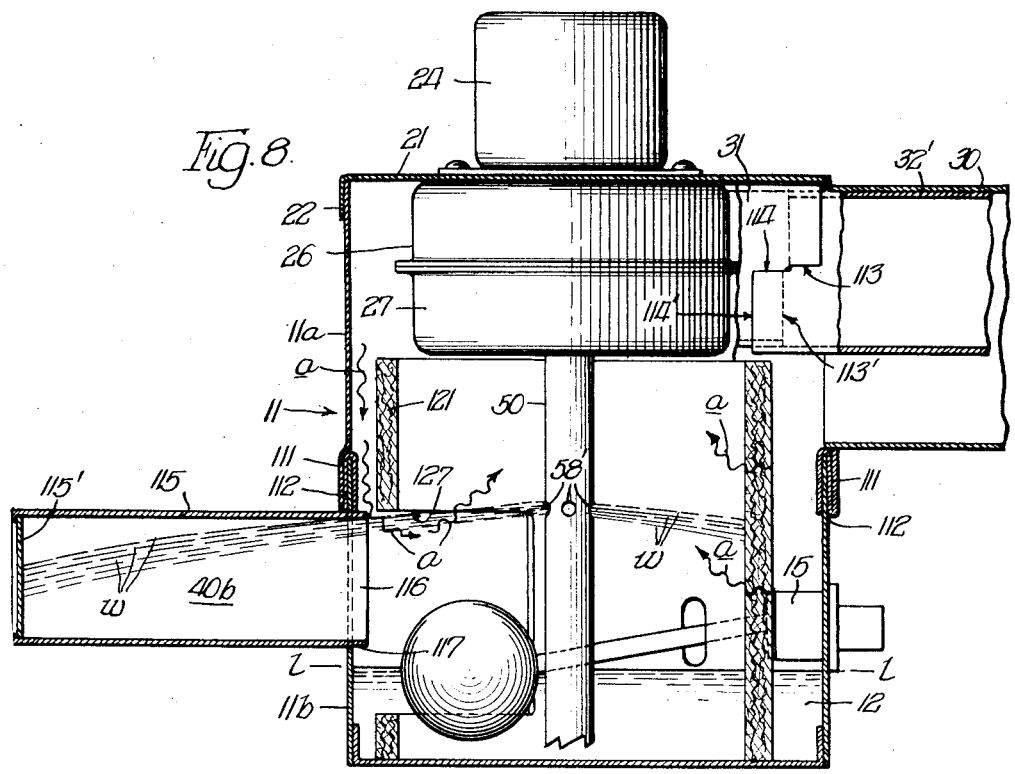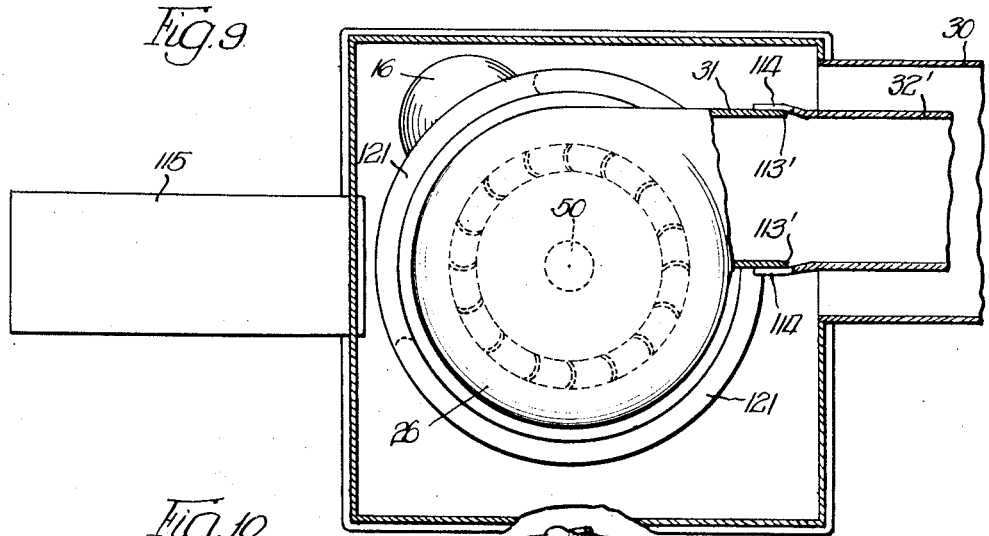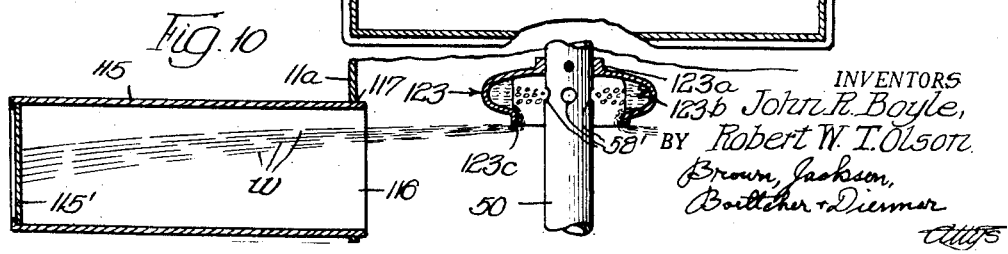

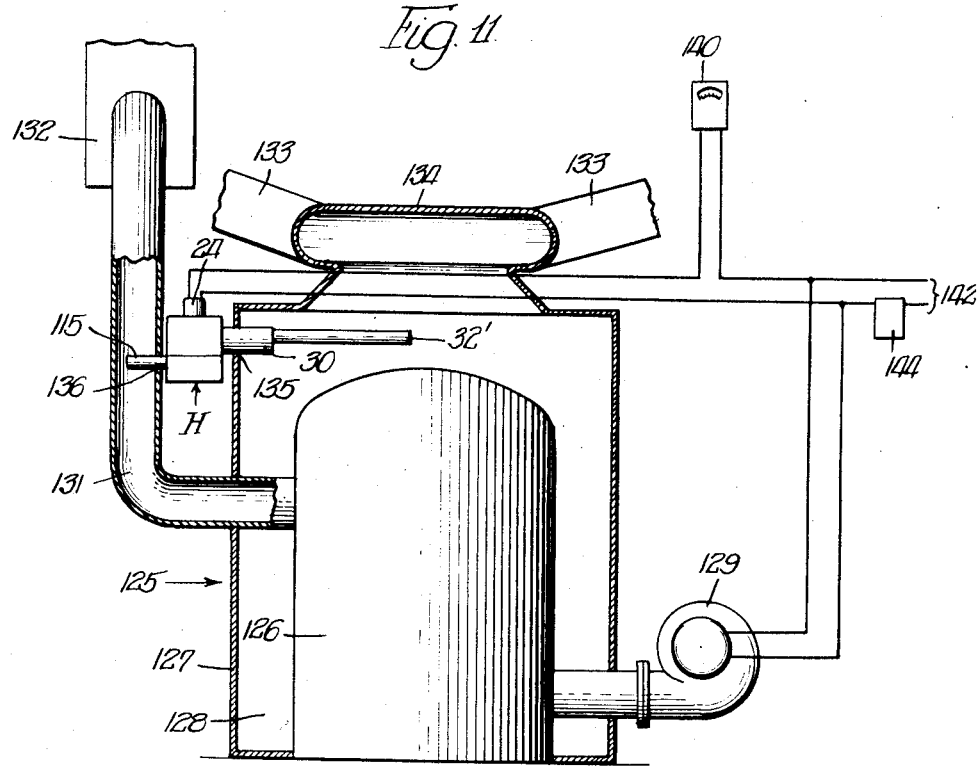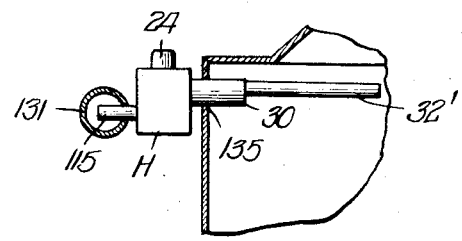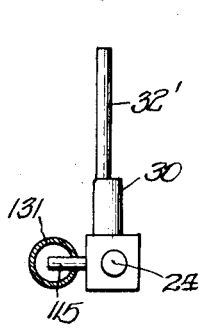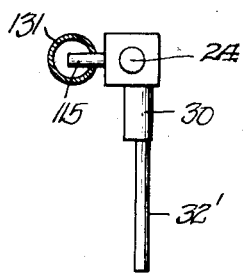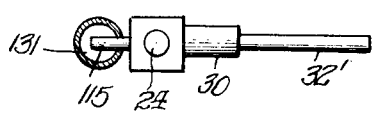
INVENTORS
John R. Boyle,
Robert W. T. Olson

United States Patent Office 2,860,228
Patented Nov. 11, 1958

2,860,228

HUMIDIFIER

John R. Boyle and Robert W. T. Olson, Chicago, Ill.

Application March 10, 1955, Serial No. 493,394

21 Claims. (Cl. 219—39)

The present invention relates to humidifiers.

The general object of the invention is to provide a humidifier which will put maximum moisture into the air without any human discomfort.

A more specific object of the invention is to provide a humidifier in which water is sprayed against a vaporizing surface for producing flash vaporization of the relatively minute water particles in the water spray.

Another object of the invention is to produce a forced circulation of air through or adjacent to the spray vaporizing zone of the humidifier.

With regard to the general object of putting maximum moisture into the air without causing human discomfort, in one preferred embodiment of our improved humidifier the air which leaves the unit carries 85% to 90% relative humidity and is only approximately 15° F. above room temperature. The 15° increase in temperature is readily equalized in the room, and the excess moisture rapidly migrates and is absorbed by the room air, with no condensation nor any wet spots about the unit. Prior devices spraying cold water tend to reduce the air temperature by evaporation, whereupon the colder air cannot hold the moisture, resulting in a wet area around the unit. The resulting colder air and precipitating moisture gives the room a cold, clammy feeling. Prior devices utilizing a stream jet for humidifaction serve to inject hot moisture into the air stream, which is usually at a temperature of approximately 80° to 120°, with the steam at a temperature of 212° F. The cool air picks up the heat and condenses about three-fourths of the steam as water, resulting in a very wet area around the unit. The air after passing the steam jet is very hot, but does not carry much moisture. This is not only uncomfortable but it upsets the thermostatic controls.

Another object of the invention is to provide an improved humidifier in which water is sprayed against a vaporizing surface in the form of an electrical heating element. Our improved device is in contrast to prior electrically heated humidifiers in which the electrical heating element is immersed in the water. The flash vaporization of water sprayed against an electrical heating element results in a more rapidly acting and more efficient humidifier than is possible in the immersed heater type, which must bring the entire body of water to the vaporizing point to effect vaporization. Another advantage of the spray type of humidifier is that it permits the use of a "bare" type of electrical heating element, having no insulating covering, without the hazard of grounding the body of water and the metallic structure of the humidifier. In the immersed heater type of humidifier, the use of bare heating elements requires taking elaborate precautions to prevent the user from receiving a shock from the body of water or from any metallic structure of a humidifier having contact with the water.

Another object of the invention is to provide an improved humidifier in which water is sprayed against a vaporizing surface which is heated by the stack gases from a furnace or the like. This type of humidifier is particularly adapted for domestic hot air heating systems. By heating the flash vaporizing surface of the humidifier with the waste heat of the stack gases, it is possible to evaporate a large amount of water without any energy cost, and still not reduce the draft or stack temperature enough to cause burner difficulty.

The flash vaporization of water sprayed against a vaporizing surface results in a humidifier which is capable of humidifying a larger volume of air in a smaller unit than is possible in the immersed electrical heater type of humidifier, or in the absorbent wick type of humidifier, or in the type adapted to be hung on a radiator. The immersed electrical heater type has the above stated objections. Humidifying units using an absorbent wick surface to raise the water by capillary attraction usually have insufficient air to carry away the evaporated water. Furthermore, the capillary action ceases when the wick surface becomes dirty, with the result that the device fails to function. Humidifying units hung on radiators do not evaporate much water because the disengaging surface is small. All of these objections are avoided in our improved flash vaporization spray type of humidifier.

Other objects, features and advantages of the invention will be apparent from the following detail description of certain preferred embodiments of the invention. In the accompanying drawings illustrating such embodiments:

Figure 1 is a vertical sectional view of a commercial embodiment adapted for introducing humidity into the duct system of a hot air heating installation.

Figure 2 is a horizontal sectional view thereof, showing the air admission and discharge between the humidifying unit and the air duct;

Figures 3 and 4 are an axial sectional view and an end elevational view of the rotary spinner which lifts the water centrifugally and sprays it against the electrical heating element; these figures being on a larger scale than Figures 1 and 2;

Figure 5 is a view similar to Figure 1, showing the use of an insulated type of electrical heating element;

Figure 6 is a side view, partly in elevation and partly in section, showing a portable home unit type of humidifier embodying our invention;

Figure 7 is a fragmentary sectional view of a modified form of the unit shown in Figure 6;

Figure 8 is a vertical sectional view of the embodiment in which the flash vaporizing surface is heated by the stack gases of a furnace or the like;

Figure 9 is a horizontal section view thereof;

Figure 10 is a fragmentary view similar to Figure 8, showing a combined spraying and hydraulic balancing spinner mounted on the spinner tube;

Figure 11 is a diagram showing the connected relation of the latter embodiment to the stack and to the hot air chamber of the furnace; and Figures 12 to 15 are schematic diagrams showing different connected relations of the latter embodiment.

Referring first to the embodiment shown in Figures 1 to 4 inclusive, this form of unit is enclosed in a sheet metal housing 11, preferably of rectangular outline. The bottom of this housing 11 defines a water container or tank 12 which is adapted to be supplied with water through a water supply pipe 14. The water is maintained at a substantially constant level 1—1 in the container or tank 12 by a water inlet valve 15 controlled by a level responsive float 16. Opening outwardly from the casing 11 just above the predetermined level 1—1 is an overflow outlet or vent 17 which prevents the water level rising appreciably above the predetermined level 1—1 in the event that the float controlled valve 15 should fail to function.

The top of the housing 11 is closed by a removable cover 21 having a downturned marginal flange 22 fitting over the sides of the housing 11. Secured to the top of the removable cover 21 is a vertically disposed electric motor 24 having its shaft 25 extending down vertically through the cover. Secured to the under side of the cover is a blower 26 comprising a housing 27 and a centrifugal impeller 28, this impeller being secured to the motor shaft 25. The impeller is preferably of the non-overloading high speed type wherein the blades have a slight forward curvature in the direction of rotation. The blower housing 27 draws air through an air inlet 29 formed in its under side, and discharges air through a tangential discharge passageway 31 which extends out through a side wall of the housing 11. This air discharge passageway 31 is surrounded by an air inlet passageway 30 which extends laterally from a side wall of the housing 11. The air inlet passageway 30 and the air discharge passageway 31 are adapted to be inserted through a single opening 34 cut in the wall of a sheet metal air duct 35, as will be presently described.

Referring now to the flash vaporization chamber or zone this is indicated at 40 and is defined within a cylindrical shell 41 composed of a heat refractory insulating material, typically represented by "Transite." This cylindrical shell 41 is disposed vertically below the blower, with the axis of the shell aligned with the air inlet opening 29 in the under side of the blower housing. The upper end of the refractory shell 41 is suitably secured by bolts or screws to the under side of the blower housing 27, either in direct abutment with the blower housing, or with a slight space intervening. For example, insulating spacers 42 may be secured between the upper end of the heat refractory shell 41 and the under side of the blower housing 27, these spacers leaving a small intervening space 43. The lower end of the shell 41 is spaced from the water level 1—1 by an annular space 44 through which the major portion of the air stream passes in flowing through the flash vaporization zone 40 into the blower.

Mounted on the inner surface of the heat refractory shell 41 is an electrical heating element 45. This element preferably comprises a series of bare filament heating coils 45' mounted vertically at uniformly spaced points around the inner wall surface of the heat refractory shell, the coils having anchored attachment to mounting pins 46 embedded in the Transite shell 41. The heating coils may be connected in series or in series parallel to the 110 volt or 220 volt supply line.

The action of lifting the water and spraying it against the electrical heating element 45 is performed by a rotary spinner 50 which extends centrally of the cylindrical flash vaporization zone 40. This rotary spinner consists of a tube which has its upper end axially secured to the blower impeller 28 and which has its lower end extending down into the body of water in container 12. As shown in Figures 3 and 4, the lower end of the spinner is formed with water scoops 52 which scoop the water inwardly and upwardly in the rotary motion of the spinner, and which also form a constriction at the lower end of the spinner tube for supporting the parabolic annulus of water that is caused to flow upwardly in the tube by centrifugal force. These water scoops are formed by cutting longitudinal slits 53 at uniformly spaced points around the lower end of the tube, and then bending the intervening wall portions of the tube inwardly along diagonal or sloping lines. The resulting scoops 52 have inwardly inclined and upwardly sloping inner edges 54, and have substantially radially extending upper trailing edges 55. The direction of rotation of the spinner tube is such that the scoops 52 elevate the water within the tube initially, following which the water takes on the rotary spin of the tube and climbs the inner wall of the tube by centrifugal force, the scoops forming a constricted lower end in the tube for maintaining a parabolic annulus of water climbing the tube under centrifugal force.

The water is sprayed from the upper portion of the tube through a series of spray apertures 58. These apertures spray the water against the electrical heating element 45, and may be distributed along the length of the tube throughout the entire height of the flash vaporization zone 40, or may be confined to the upper portion of the vaporization zone, so that the water contacting the lower portions of the heating element coils will be excess splash water and trickle water dropping down from the upper portions of the coils.

The water discharge from the spray apertures 58 is in an atomized or finely divided state when it contacts the electrical heating element 45, with the result that a substantial proportion of the relatively minute water particles will undergo flash vaporization immediately upon contact with the highly heated surface of the vaporizing element 45. The stream of air passing along the surface of the water and upwardly through the flash vaporization zone into the blower intake 29 picks up this vaporized water and carries it into the blower, where the impeller 28 exerts a mechanical break-up action on the water vapor and also thoroughly mixes the water vapor with the volume of air. The resulting humidified air is discharged from the blower through discharge passageway 31.

It will be noted that the electrical heating element 45 is supported in electrically insulated relation from the body of water in the container 12, this electrically insulated relation being maintained by the annular air gap 44 between the bottom end of the heat refractory shell 41 and the water level 1—1. No solid stream of water crosses this air gap 44, the water which is discharged from the refractory shell 41 down into the container 12 being in the form of drops or small separated bodies of water. The relatively high velocity flow of air through the gap 44 up into the flash vaporizing zone 40 also tends to break up the return water discharging down across the gap 44. The small stream of air which enters the upper intervening space 43 between the top of the refractory shell 41 and the under side of the blower housing 27 tends to prevent any sheet of water being carried up along the inner surface of the refractory shell 41 into contact with the sheet metal housing of the blower.

Referring now to the manner of connecting the humidifying unit with the air duct 35, it will be seen from Figure 2 that the air inlet passageway 30 is inserted in a single circular opening 34 cut in the side wall of the sheet metal duct 35. This air inlet passageway 30 terminates just inside the wall of the duct 35, so that the passageway draws from the boundary layer of air traversing the duct, this boundary layer of air passing from the duct through the inlet passageway 30 into the interior of the sheet metal housing 11, from whence it passes down through air gap 44 up into the flash vaporization zone 40. The air discharge passageway 31 leading from the blower is enveloped or enclosed within the air inlet passageway 30, so that it passes through the same hole 34 cut in the side wall of the air duct 35. An extension sleeve 32 fits over the discharge passageway 31 for carrying the humidified air stream into the central zone or region of the duct 35. The inner end of the sleeve 32 is formed with an inclined baffle or wall 33 for directing the humidified air stream in a direction longitudinally of the duct. The extension sleeve 32 has a rotatable fit on the air discharge passageway 31, so that the sleeve 32 can be turned to face vertically for a vertically extending duct or at any other angle for an angularly inclined duct.

In Figure 5, we have illustrated a modified construction of the above described humidifying unit, the modification residing principally in the use of an insulated type of electrical heating element. This heating element, designated 60 in its entirety, comprises a central heating filament 61 composed of Nichrome or the like, an insulating sheath 62 composed of asbestos or the like, and an outer casing or covering 63 preferably composed of copper, brass, stainless steel or the like. This insulated heating element 60 is wound in a helical coil, which is disposed vertically in the position occupied by the heat refractory shell 41 in the preceding embodiment. Thus, this helical coil defines the flash vaporization zone 40 in this embodiment.

The upper portion of the heating coil is snugly surrounded by a cylindrical sheet metal shell 65 having an upper securing flange 66 for attachment to the under side of the blower housing 27. This shell compels the air stream to enter the flash vaporization chamber 40 through the lower end of the coil, and to a limited extent between the lower convolutions of the coil. Because of the insulated nature of this heating coil 60, there is no danger of grounding the unit through contact between the heating coil and the shell 65, or through contact between the heating coil and the body of water. The operation of this embodiment is otherwise the same as that of the preceding embodiment.

In Figures 6 and 7 we have shown our invention embodied in a portable home unit type of humidifier. This comprises a cylindrical base housing 11a which is covered at the top by a dome-shaped cover 21a having a depending flange 22a which fits down over the base housing 11a. The outer peripheral portion of the cover 21a is formed with a ring of air inlet holes 70 through which the unhumidified air enters the unit, and the top portion of the cover is formed with a ring of air discharge openings 71 through which the humidified air leaves the unit. The electric motor 24a is mounted on the top side of the cover 21a and is preferably enclosed in a dome-shaped cover 72 provided with ventilating apertures 73.

The flash vaporization zone or chamber 40a is defined in a cylindrical heat refractory shell 41a which is similar to the shell 41 of the preceding embodiment of Figures 1 and 2. The upper end of the refractory shell 41a has abutment against the under side of the cover 21a at a point just outside of the ring of discharge apertures 71, the shell 41a being secured to the cover 21a by screws 75. The lower edge of the heat refractory shell 41a is spaced from the water level 1—1 by the annular air gap 44a through which the admission air enters the flash vaporization chamber 40a. The electrical heating element is shown as being of the bare type of filament 45a having the filament coils 45a' mounted vertically at uniformly spaced points around the inner wall surface of the heat refractory shell 41a, the same as described of the embodiment shown in Figures 1 and 2.

The air impelling means is in the form of a fan 77 instead of a blower. This fan is mounted on the motor shaft 25a in the upper portion of the flash vaporization chamber 40a, in position for drawing air upwardly through this chamber and discharging it out through the discharge apertures 71. The fan comprises a solid disc portion 78 to prevent spray from entering the electric motor 24a, and from the periphery of this disc portion radiate the fan blades 79, located directly below the ring of air discharge holes 71. The rotary spinner 50a is secured to the motor shaft 25a and to the fan 77, and extends down axially of the flash vaporization zone 40a into the body of water contained in container 12a. This spinner has the same relation of scoops or vanes 52a, and has a series of discharge apertures 58a, for lifting the water from the container and discharging it against the heated filament coils 45a'.

The water container 12a is adapted to be filled to the level 1—1 through a filler tube or spout 81 which extends downwardly from an opening 82 in the cover 21a. Disposed within the filler tube is a ball float 84 which is adapted to have seating engagement against a constriction 85 formed in the filler tube 81. The constriction 85 is at such height in the filler tube that when the water level appreciably exceeds the predetermined maximum level 1—1 in the filling operation, the ball float 84 will seat against the constriction 85, and thereby prevent the introduction of further water into the container 12a. Thus, the water level in the container is prevented from being brought up to the point where it will have grounding contact against the bare heating coils 45a. Extending through the ball float 84 is a sight rod 87, the upper end of which is visible in the upper end of the filling tube 81. When this sight rod is down substantially out of sight in the filling tube it indicates that the water level is low, and should be replenished. If desired, a small weight 88 may be secured to the bottom side of the ball float 84 to hold the sight rod 87 erect.

Extending diametrically across the lower end of the filling tube 81 is a trip lever 91 which is pivotally mounted at one end on a pivot pin 92 carried by the wall of the filler tube 81. The other end of the trip lever 81 extends through a longitudinal notch or slot 93 cut in the tube 81, and has a wire link 95 pivotally connected to its projecting end. The upper end of this wire link has pivotal connection to the actuating arm 96 of an electric switch 97 which is connected in series with the heating coil 45a. When the water level falls to an abnormally low level the ball float 84 and weight 88 descend and actuate the tripping lever 91 for opening the switch 97 governing the supply circuit to the heating coil 45a for interrupting the further energization of this coil until the body of water in the container 12a is replenished.

Carried by the cover 21a is a manually operable control switch 101 which controls the current supply connection to the motor 24a and to the heating coil 45a. Also carried by the cover 21a is a signal light 102 which is illuminated when the control switch 101 is in its closed circuit position and the motor 24a and heating coil 45a are energized.

In Figure 7 we have shown a modification of the portable home unit type shown in Figure 6. In this modification, the filler tube 81 is dispensed with, and a side filling spout 105 is substituted therefor. This side filling spout comprises an inclined lip or wall of metal 106 extending outwardly from an opening 107 in the side wall of the cylindrical base housing 11a. The filling spout 105 is substantially at the height of the predetermined maximum level 1—1, so that the container 12a cannot be filled to a level much in excess of this predetermined maximum level without overflowing from the filler spout 105. In all other respects, this embodiment shown in Figure 7 is the same as that shown in Figure 6.

It will be noted that in each of the embodiments described, the electric motor, the air impelling means, the electrical heating element and the rotary spinner are all assembled on and carried by the removable cover 21 or 21a, so that access to each and all of these parts is instantly obtained by merely removing the cover.

The duct embodiments of humidifier illustrated in Figures 1 to 5 inclusive can be attached to any hot air heating system, installed either at the heating unit, or in the suction return air ducts, or in the air discharge ducts. If installed in the air discharge ducts, several units can be installed in one system. This would provide humidity zoning of a building, i. e. by installing these units in branch supply ducts feeding specific areas. These duct units would be permanently connected to the water supply line, and could be controlled by humidistats.

Each of the described embodiments can be operated dry, to serve as a space heater instead of a humidifier. For such possible use, the electrical heating coils 45 or 45a would be mounted on a high temperature mounting, and the float switch of Figure 6 would be eliminated. Such a space heater embodiment would be converted to a humidifier by the mere addition of water.

In Figures 8, 9 and 10, we have illustrated a furnace-type of humidifier wherein the flash vaporizing zone or chamber is heated by the stack gases from the furnace. These modified constructions are quite similar to the constructions shown in Figures 1 to 5 inclusive, with the exception of the housing 11, and the flash vaporizing zone or chamber. In these modified constructions, the housing 11 comprises an upper section 11a and a lower section 11b which are joined together by a lap joint 111 which permits the upper and lower housing sections to be assembled with the sections facing in different horizontally turned relations. The lap joint 111 consists of a three ply fold of the metal around the bottom edge of the upper section 11a, with two of the folds spaced at 112 to receive the upper edge of the lower section 11b. The housing 11 may be made cylindrical, in which case the upper section 11a can be rotated relatively to the lower section 11b; or the housing may be of square outline, in which case the upper section 11a can be turned in 90° steps relatively to the lower section. The upper section 11a of the housing carries the electric motor 24, the blower 26, the air-circulating ducts 30, 31 and the rotary spinner 50. The blower discharge duct 31 has connection with an extension duct tube 32' which lies within the upper portion of the air inlet tube 30 and is spot welded thereto along the line of contact between the upper portions of the two tubes. The outer end of the discharge tube 32' extends beyond the outer end of the inlet tube 30 so as to avoid short circuiting of the air flow between said tubes. To facilitate removal of the blower 26, a split bayonet duct joint is installed between the blower discharge duct 31 and the extenstion discharge tube 32'. This joint comprises a horizontal cut 113 and a vertical cut 113' in the blower discharge duct 31 forming an overhanging notched end; and comprises a horizontal cut 114 and a vertical cut 114' in the extension tube 32' forming a matching notched end in the latter. These two notched ends are sprung together by the resilience of the sheet metal tubing. The cover 21 of the housing is removable for cleaning the motor 24, the blower 26, and also the filter 121 which will presently be described.

Referring now to the flash vaporizing zone or chamber, this is designated 40b in Figure 8, and is defined within a metallic tube 115 which projects outwardly substantially horizontally from the lower housing section 11b. This tube 115 has an open inner end 116 secured in an aperture 117 which is cut in the side wall of the lower housing section 11b at a point just above the water level 1—1. The projecting outer end of said tube 115 is sealed off by a metallic end wall 115', which is preferably in the form of a disc secured in the end of the tube, although it might consist of an end head formed integrally of the body of the tube. The tube 115 and end wall 115' are preferably composed of copper in order to have maximum heat conductivity and minimum corrosion in the flash vaporizing chamber 40b, but may be formed of other materials, if desired. As will be presently described, this tube 115 extends into the stack which conducts the products of combustion away from the hot air furnace.

Surrounding the rotary spinner 50 is a cylindrical woven plastic filter 121. The lower edge of this filter extends down to the bottom of the water container 12, and the upper edge of the filter lies in close proximity to the bottom of the blower housing 27. Formed in the side of said filter is a relatively large opening 122 which is aligned with the open end of the vaporizing tube 115.

The rotary spinner has a plurality of jets or holes 58' which are preferably located substantially at one common level of the spinner tube. This level of the jets is such that the cone of water dispersion from the jets will carry the water particles into the open end 116 of the tube 115, and into contact with the side and end walls of the tube, such lines of dispersion of the water being indicated by the dash-dot lines w in Figure 8. The air flow is indicated by the wavy arrows a passing from the interior of the housing 11 to the intake of the blower, some of this air filtering through the woven plastic filter 121, and a goodly proportion of it passing down the outside of the filter and entering through the opening 122 in the filter, at which point the air passes across the open end 116 of the vaporizing tube 115 for picking up water vapor which has been vaporized in the tube. In addition to spraying water into the vaporizing tube 115, the spinner also sprays water all around the filter 121 through which air passes. This operation effects the same humidity increase in the air without the water dropping out of the air after leaving the humidifier.

The water in the container 12 is maintained at the substantially constant level 1—1 by the float 16 and water supply valve 15, operating the same as previously described. The opening 122 in the filter 121 may be laterally enlarged to accommodate the float 16; or the float may be disposed outside of the filter.

In Figure 10 we have illustrated a combined spraying and hydraulic balancing device 123 which is mounted on the spinner tube 50. This device comprises a hollow bowl-shaped spinner having an upper collar portion 123a which is pinned or keyed to the spinner tube. The bowl-shaped contour results in the formation of an annular water collecting trough 123b into which the apertures 58' in the spinner tube discharge their water. The bottom of this spraying and balancing spinner is open and is formed with an annular spraying lip 123c from which the water is sprayed into the vaporizing tube 115. The annulus of water held centrifugally in the annular trough 123b functions as a dynamic balancing medium for balancing the fan rotor 28 and rotary spinner tube 50.

In Figure 11 we have illustrated a typical installation of these latter embodiments of humidifier in a conventional hot air furnace installation. In this figure, the humidifier is shown at H, and the furnace is diagrammatically indicated at 125. The furnace comprises a fire pot 126 surrounded by a sheet metal shell 127 defining an air heating chamber 128. The furnace may be oil, gas or coal fired, a conventional oil burner being diagrammatically indicated at 129. Leading from the fire pot 126 is a stack or outlet flue 131, generally composed of sheet metal, which connects the fire pot with the chimney 132. The air heating chamber 128 circulates the heated air through ducts 133 branching out from the upper bonnet 134 of the chamber.

In mounting the humidifier H in such a furnace installation, a circular hole 135 is cut in the sheet metal shell 127 for receiving the air circulating tubes 30 and 32', and a circular hole 136 is cut in the stack 131 for receiving the vaporizing tube 115. The air discharge tube 32', which joins with the blower discharge 31 at the split bayonet duct joint 113, has its other end extending substantially beyond the end of the air intake tube 30 so as to avoid short circuiting the air flow in these tubes. The air discharge tube 32' may also extend to a point substantially centrally of the air heating chamber 128, in order to have its discharge of humidity distributed substantially equally to each of the ducts 133. The blower 26 functions to draw heated air from an outer region of the air heating chamber 128 through air intake tube 30 for picking up humidity from the flash vaporization chamber 40b and from the filter 121, the blower then impelling this humidified air through the air discharge tube 32' back into a more central region of the air heating chamber 128.

The major portion of the flash vaporizing tube 115 extends into the stack flue 131, where all surfaces of the vaporizing tube are subjected to the heat of the products of combustion from the fire pot 126. The stack temperatures are likely to range from about 350° to about 500° F. so that there is ample waste heat to maintain the tube 115 at a vaporizing temperature. Thus, it will be seen that the vaporizing tube 115 functions as a flash boiler for vaporizing the water sprayed therein by the spinner 50. Any excess water which is not vaporized drains from the tube back into the water container 12, thereby maintaining the container water at an elevated temperature, such approximating 90° F. in one typical installation.

Figures 12 to 15 inclusive illustrate the ready adaptability of the humidifier H to meet different installation conditions. In Figure 12, we have illustrated an installation in which the vaporizing tube 115 enters a horizontal section of the stack 131, instead of the vertical section shown in Figure 11. It will be evident that the vaporizing tube 115 can also enter an inclined run of the stack 131 in the same relationship. In Figure 13, the upper and lower housing sections 11a and 11b are shown in such angular relationship as to project the air circulating tubes 30 and 32' from one side of the humidifier H, and to project the vaporizing tube 115 from the diametrically opposite side of the vaporizer. This is the relationship of the tubes shown in the installation of Figure 11. In Figure 14, we have illustrated the upper housing section 11a rotated counterclockwise through an angle of 90° from the position shown in Figure 13, thereby disposing the air circulating tubes 30 and 32' at a right angle to the vaporizing tube 115. In Figure 15, we have shown the upper housing section 11a rotated clockwise through an angle of 90° from the position shown in Figure 13, thereby disposing the air circulating tubes 30 and 32' at an angle removed 180° from the position shown in Figure 14. In the case of the housing sections 11a and 11b being made of cylindrical section, the upper housing section and the air circulating tubes 30, 32' may be disposed at any intermediate angular position, between the positions shown in Figures 13, 14 and 15. This ability to dispose the air circulating tubes at different angles relatively to the vaporizing tube adapts the humidifier to easy installation.

The humidifier H is preferably controlled by a humidistat 140 responding to the humidity of the room or enclosure supplied with hot air by the furnace. Also, the electric motor 24 of the humidifier is preferably connected to the supply circuit 142 for the motor of the burner or blower 129, which supply circuit is controlled by a room thermostat 144 or by a relay responsive thereto. Thus, the humidifier will only operate when the burner or blower 129 operates, because it is of small avail to operate the humidifier when the stack 131 is cool. Furthermore, humidity is only required, ordinarily, when the furnace is in operation. When the desired degree of humidity is obtained, the humidistat 140 shuts off the motor 24 and stops operation of the blower 26 and spinner 50, as result of which no water is flashed in the hot vaporizing tube, and no air is circulated through the humidifier. This affords a very quick stopping of the humidifying operation, so that there is no over-riding in the humidifying action, such as is experienced in prior humidifiers.

While we have illustrated and described what we regard to be the preferred embodiments of our invention, nevertheless it will be understood that such are merely exemplary and that numerous modifications and rearrangements may be made therein without departing from the essence of the invention.

We claim:

1. In a humidifier of the flash vaporizing type, the combination of a housing, a water chamber in said housing in which a substantially constant water level is normally maintained, an electric motor supported by said housing with the rotative axis of its drive shaft disposed substantially vertically above said water chamber, horizontally disposed air impelling means mounted below said motor and driven thereby, rotary water lifting and atomizing means comprising a substantially vertical spinner tube of cylindrical form disposed coaxially below said air impelling means and rotated concurrently therewith by said electric motor, the lower end of said cylindrical tube extending below the water level in said water chamber, water lifting scoops extending inwardly at the submerged lower end of said cylindrical spinner tube, said scoops being formed by cutting longitudinal slits in the lower end of said tube and bending the intervening wall portions of the tube inwardly along upwardly sloping diagonal lines, said scoops acting to impel the water upwardly in said cylindrical tube, a plurality of angularly spaced discharge apertures in the upper portion of said cylindrical spinner tube through which the upwardly impelled water is projected outwardly in the form of an atomized spray, a flash vaporization zone comprising a cylindrical surface arranged substantially concentrically of and spaced from said cylindrical spinner tube, air passageways in said housing through which said air impelling means causes air to flow for picking up water vapor produced in said flash vaporization zone, and means for producing heat in said flash vaporization zone.

2. In a humidifier of the flash vaporizing type, the combination of a housing, a water chamber in said housing in which a substantially constant water level is normally maintained, an electric motor supported by said housing with the rotative axis of its drive shaft disposed substantially vertically above said water chamber, horizontally disposed air impelling means mounted below said motor and driven thereby, rotary water lifting and atomizing means comprising a substantially vertical spinner tube of cylindrical form disposed coaxially below said air impelling means and rotated concurrently therewith by said electric motor, the lower end of said cylindrical spinner tube extending below the water level in said water chamber, water lifting scoops extending inwardly in the submerged lower end of said cylindrical spinner tube, said scoops being in the form of upwardly sloping internal vanes acting to impel the water upwardly in said cylindrical inner tube, a plurality of angularly spaced discharge apertures in vertically staggered relation in the upper portion of said cylindrical spinner tube through which the upwardly impelled water is projected outwardly in the form of an atomized spray, a flash vaporization zone comprising a cylindrical spray confining surface arranged substantially concentrically of and spaced from said cylindrical spinner tube, electrically energized heating means arranged inside of said cylindrical spray confining surface and adapted to have the atomized spray impinge thereon at different levels by reason of the vertically staggered relation of said discharge apertures, the lower edge of said cylindrical spray confining surface being spaced upwardly above the water level in said water chamber around all sides of said flash vaporization zone so that no solid wetted surface can conduct electricity from said electrically energized heating means to the water in said water chamber, and an air passageway passing under said upwardly spaced lower edge of said cylindrical spray confining surface and up through said flash vaporization zone and through which said air impelling means causes air to flow for picking up water vapor in said flash vaporization zone.

3. In a humidifier of the flash vaporizing type for use with a furnace, the combination of a housing, a water chamber in said housing in which a substantially constant water level is normally maintained, an electric motor supported by said housing with the rotative axis of its drive shaft disposed substantially vertically above said water chamber, horizontally disposed air impelling means mounted below said motor and driven thereby, rotary water lifting and atomizing means comprising a substantially vertical spinner tube of cylindrical form disposed coaxially below said air impelling means and rotated concurrently therewith by said electric motor, the lower end of said cylindrical spinner tube extending below the water level in said water chamber, water lifting scoops extending inwardly in the submerged lower end of said cylindrical spinner tube, said scoops being in the form of upwardly sloping internal vanes acting to impel the water upwardly in said cylindrical inner tube, a plurality of angularly spaced discharge apertures in the upper portion of said cylindrical spinner tube through which the upwardly impelled water is projected outwardly, a flash vaporization zone comprising a cylindrical surface arranged substantially concentrically of and spaced from said cylindrical spinner tube and also comprising a laterally projecting heating chamber arranged to be heated by the products of combustion from the furnace, said heating chamber receiving atomized spray from said spinner tube, and air passageways in said housing through which said air impelling means causes air to flow for picking up water vapor produced in said flash vaporization zone.

4. In a humidifier of the flash vaporizing type, the combination of a housing, a water chamber in said housing in which a substantially constant water level is normally maintained, an electric motor supported by said housing with the rotative axis of its drive shaft disposed substantially vertically above said water chamber, horizontally disposed air impelling means mounted below said motor and driven thereby, rotary water lifting and atomizing means comprising a substantially vertical spinner tube of cylindrical form disposed coaxially below said air impelling means and rotated concurrently therewith by said electric motor, the lower end of said cylindrical tube extending below the water level in said water chamber, water lifting scoops extending inwardly at the submerged lower end of said cylindrical spinner tube, said scoops being formed by cutting longitudinal slits in the lower end of said tube and bending the intervening wall portions of the tube inwardly along upwardly sloping diagonal lines, said scoops acting to impel the water upwardly in said cylindrical spinner tube, a plurality of angularly spaced discharge apertures in the upper portion of said cylindrical spinner tube through which the upwardly impelled water is projected outwardly, a flash vaporization zone comprising a cylindrical surface arranged substantially concentrically of and spaced from said cylindrical spinner tube, air passageways in said housing through which said air impelling means causes air to flow for picking up water vapor produced in said flash vaporization zone, means for producing heat in said flash vaporization zone, and a bowl-shaped member on said spinner tube defining an annular internal trough into which the water is discharged from the discharge apertures in said spinner tube, the water in said annular internal trough forming a dynamic balancing annulus of water and being discharged therefrom into said flash vaporization zone.

5. In a humidifying unit for introducing humidity into an air duct, the combination of a housing including a water container, means for maintaining a substantially constant water level in said container, a cylindrically arranged electrical heating element disposed above said water level and defining a flash vaporization zone, an electric motor, a rotary spinner driven by said electric motor and arranged to lift water from said container and to spray it upon said electrical heating element in said flash vaporization zone, an air admission passageway for establishing communication between said duct and the interior of said housing, an air discharge passageway for establishing communication between said flash vaporization zone and said duct, and air impelling means driven by said electric motor for causing air to enter said housing from said duct through said air admission passageway and for causing air to leave said flash vaporization zone and to return to said duct through said air discharge passageway.

6. In a humidifying unit for introducing humidity into an air duct, the combination of a housing including a water container, means for maintaining a substantially constant water level in said container, a cylindrically arranged electrical heating element disposed above said water level and defining a flash vaporization zone, an electric motor above said zone, a rotary spinner driven by said electric motor extending down through said zone and having its lower end immersed in the water in said container, said spinner arranged to lift water centrifugally from said container and to spray it upon said electrical heating element in said flash vaporization zone, a blower driven by said electric motor and having its intake drawing air from said housing through said flash vaporization zone, an air admission passageway for admitting air from said duct into the interior of said housing for flow across said water level into said flash vaporization zone, and an air discharge passageway extending from the outlet of said blower and passing through said air admission passageway for returning the air after humidification into said air duct.

7. In a humidifier, the combination of a water container, an electrical heating coil extending upwardly from said water container and defining a flash vaporization zone, said electrical heating coil comprising a heating element, an insulating sheath and a metallic covering encasing said heating element and said insulating sheath motor driven means operating to lift water from said container and to spray it on said electric heating coil, and air impelling means for circulating air through said flash vaporization zone.

8. In a humidifier, the combination of a water container, an electric heating coil extending upwardly from said water container and defining a flash vaporization zone, said electrical heating coil comprising a heating element, an insulating sheath and a metallic covering encasing said heating element and said insulating sheath, an electric motor disposed above said flash vaporization zone, a spinner driven by said electric motor and extending vertically down through said zone with its lower end immersed in the water in said container, said spinner lifting water centrifugally from said container and spraying it against said electric heating coil, and air impelling means driven by said electric motor and arranged to circulate air through said flash vaporization zone.

9. In a humidifier, the combination of a water container, an electric heating element disposed above the water level in said container, an electric motor, a rotary spinner driven thereby operating to lift water centrifugally from said container and to spray it on said heating element for effecting flash vaporization of the water spray, air impelling means driven by said electric motor for circulating air past said heating element to pick up humidity from the water discharged thereon, a filling spout for said water container, and a float arranged to close said filling spout when the water level in said container reaches a predetermined height.

10. In a humidifier, the combination of a water container, an electrical heating element disposed above the water level in said container, an electric motor, a rotary spinner driven thereby operating to lift water centrifugally from said container and to spray it on said heating element for effecting vaporization of the water spray, air impelling means driven by said electric motor for circulating air past said heating element to pick up humidity from the water discharged thereon, and a float control switch responsive to the water level in said container for controlling the energization of said heating element.

11. In a humidifier for a hot air furnace having an outer air heating chamber and an exhaust stack, the combination of a housing having a water container, a substantially horizontally extending vaporizing tube projecting laterally from said housing into said exhaust stack to be heated thereby, motor driven means operating to lift spray water substantially vertically from said container and to project it substantially horizontally into said vaporizing tube, air intake and discharge tubes extending from said housing into said outer air heating chamber, and means for impelling air through said latter tubes past said vaporizing tube to pick up humidity from the water discharged therein.

12. In a humidifier for a hot air furnace comprising a fire pot, an air heating chamber and a stack, the combination of a humidifier housing having a water container, a substantially horizontal vaporizing tube projecting laterally from said housing above the water level in said container, said vaporizing tube extending into said stack, motor driven means for lifting water substantially vertically from said water container and projecting it substantially horizontally into said vaporizing tube, air circulating inlet and discharge tubes extending from said housing into said air heating chamber, one of said latter air circulating tubes extending longitudinally within the other of said air circulating tubes and air impelling means for circulating air from said air heating chamber through said air inlet tube, past said vaporizing tube, and back through said air discharge tube into said air heating chamber.

13. In a humidifier, the combination of a housing comprising relatively rotatable first and second sections, air inlet and discharge tubes extending from said first section, a vaporizing surface extending from said second section, a water container in said housing, motor driven means for spraying water from said water container onto said vaporizing surface, and air impelling means causing air to enter said housing through said air inlet tube and to flow past said vaporizing surface and to discharge from said housing through said air discharge tube, said first and second housing sections being rotatable to different angles relatively to each other, whereby to enable said air inlet and discharge tubes and said vaporizing surface to project outwardly from said housing at different angles relatively to each other.

14. In a humidifier, the combination of a housing comprising relatively rotatable upper and lower sections, a water container in said lower section, a vaporizing tube extending from said lower section above the level of the water in said container, an electric motor, means driven thereby for lifting water from said container and for spraying it into said vaporizing tube, an air inlet and an air discharge tube extending from said upper section, and air impelling means driven by said electric motor for causing air to enter said housing through said air inlet tube and to flow past said vaporizing tube and to discharge from said housing through said air discharge tube, said upper and lower housing sections being rotatable to different angles relatively to each other, whereby to dispose said vaporizing tube and said air inlet and discharge tubes at different angles relatively to each other.

15. In combination, a hot air furnace comprising a burner and a stack, electrically responsive means for operatively controlling said burner, a thermostat for controlling said electrically responsive means, a humidifier comprising a vaporizing surface arranged to be heated by the gases in said stack, a water container, an electric motor, water projecting means driven by said motor operative to project water from said water container onto said vaporizing surface, air impelling means driven by said electric motor for circulating air past said vaporizing surface and into the hot air system of said furnace, a humidistat, and circuit connections for said electric motor controlled jointly by said thermostat and by said humidistat.

16. In combination, a hot air furnace comprising a burner and a stack, electrically responsive means for operatively controlling said burner, a thermostat for controlling said electrically responsive means, a humidifier comprising a vaporizing surface arranged to be heated by the gases in said stack, an electric motor, water projecting means driven thereby operative to project water onto said vaporizing surface, air impelling means driven by said electric motor for circulating air past said vaporizing surface and into the hot air system of said furnace, a humidistat, and circuit connections for said electric motor controlled jointly by said thermostat and by said humidistat.

17. In a humidifier, the combination of a water container, a heated surface disposed above the water level in said container, an electric motor, and a combined water lifting, dynamic balancing and water spraying device driven by said electric motor comprising means adapted to lift water from said container, and means operative to hold a dynamically balancing ring of water, and to spray water on said heated surface.

18. In a humidifier, the combination of a water container, a heated surface disposed above the water level in said container, an electric motor, air impelling means driven by said electric motor for impelling air past said heated surface, and a combined water lifting, hydraulic balancing and water spraying device driven by said electric motor, said latter device comprising a tube having inwardly extending scoops at its lower end immersed below the water level in said container for lifting the water therefrom, discharge means for discharging the water from said tube above said water level, and a bowl-shaped member defining an annular trough in which the water discharged from said discharge means forms a dynamic balancing annulus of water, the water being sprayed from said bowl-shaped member upon said heated surface.

19. In a humidifier of the flash vaporizing type, the combination of a housing, a water chamber in said housing in which a substantially constant water level is normally maintained, an electric motor supported by said housing with its drive shaft disposed substantially vertically above said water chamber, horizontally disposed air impelling means mounted below said water and driven thereby, a rotary water lifting and atomizing device disposed coaxially below said air impelling means and rotated concurrently therewith by said electric motor, the lower end of said device being submerged below the water level in said water chamber, a flash vaporization chamber surrounding said water lifting and atomizing device, electrically energized heating means arranged inside of said flash vaporization chamber and adapted to have the water sprayed by said device impinge thereon, the lower edge of said flash vaporization chamber being spaced upwardly above the water level in said water chamber around all sides of said flash vaporization chamber so that no solid wetted surface can conduct electricity from said electrically energized heating means to the water in said water chamber, and an air passageway passing under said upwardly spaced lower edge of said flash vaporization chamber, and up through said vaporization chamber, and through which said air impelling means causes air to flow for picking up water vapor in said flash vaporization chamber.

20. In a humidifier for a furnace having a combustion chamber, the combination of a water container, a flash vaporizing wall adapted to have the products of combustion from said combustion chamber impinge directly against one side surface of said flash vaporizing wall for heating said wall to a high flash vaporizing temperature, rotary spinner means arranged to lift water from said water container and to project it centrifugally in fine particle form directly against the opposite side surface of said flash vaporizing wall for effecting immediate flash vaporization of the water particles, air impelling means mounted coaxially of said rotary spinner means arranged to circulate air past the latter surface of said flash vaporizing wall so as to pick up humidity from the water particles vaporized thereon, means for directing the air thus humidified into the flow of hot air heated by said furnace, and an electric motor connected to drive said rotary spinner means and said air impelling means.

21. In a humidifier, the combination of a water container, an electrical heating coil extending upwardly from said water container and defining a flash vaporization zone, said electrical heating coil comprising a heating element and an insulating sheath encasing said heating element, motor driven means operating to lift water from said container and to spray it on to said electrical heating coil, and air impelling means for circulating air through said flash vaporization zone.

(References on following page)

References Cited in the file of this patent

UNITED STATES PATENTS

| | | |
|---|---|---|
| 1,815,306 | Lawrence | July 21, 1931 |
| 1,821,886 | Fleisher | Sept. 1, 1931 |
| 1,839,618 | Toepfer | Jan. 5, 1932 |
| 1,963,412 | Lewis | June 19, 1934 |
| 2,125,581 | Pearce | Aug. 2, 1938 |
| 2,379,932 | Schoepflin | July 10, 1945 |
| 2,497,435 | Branneman | Feb. 14, 1950 |